(12) United States Patent
Genter

(10) Patent No.: US 9,010,117 B2
(45) Date of Patent: Apr. 21, 2015

(54) MULTI-STAGE TURBOCHARGER SYSTEM WITH INTERCOOLING AND AFTERCOOLING

(71) Applicant: Cummins Inc., Columbus, IN (US)

(72) Inventor: David P. Genter, Columbus, IN (US)

(73) Assignee: Cummins Inc., Columbus, IN (US)

( * ) Notice: Subject to any disclaimer, the term of this patent is extended or adjusted under 35 U.S.C. 154(b) by 108 days.

(21) Appl. No.: 13/835,726

(22) Filed: Mar. 15, 2013

(65) Prior Publication Data

US 2014/0260239 A1 Sep. 18, 2014

(51) Int. Cl.
*F02B 37/00* (2006.01)
*F02B 37/007* (2006.01)
*F02B 37/013* (2006.01)

(52) U.S. Cl.
CPC .............. *F02B 37/004* (2013.01); *F02B 37/007* (2013.01); *F02B 37/013* (2013.01)

(58) Field of Classification Search
CPC .... F02B 37/004; F02B 37/013; F02B 37/001; F02B 29/0493; F02B 27/007
USPC .................................... 60/612, 599; 123/563
See application file for complete search history.

(56) References Cited

U.S. PATENT DOCUMENTS

| | | | |
|---|---|---|---|
| 2,500,234 A | 3/1950 | Bates | |
| 3,576,102 A | 4/1971 | West | |
| 4,299,090 A | 11/1981 | Deutschmann | |
| 4,753,076 A * | 6/1988 | Deutschmann et al. | ........ 60/612 |
| 5,269,143 A | 12/1993 | Cikanek et al. | |
| 5,394,854 A | 3/1995 | Edmaier et al. | |
| 5,771,868 A | 6/1998 | Khair | |
| 6,311,493 B1 | 11/2001 | Kurihara et al. | |
| 6,564,783 B2 | 5/2003 | Chou et al. | |
| 6,651,618 B1 | 11/2003 | Coleman et al. | |
| 6,981,375 B2 | 1/2006 | Sisken et al. | |
| 7,201,121 B2 | 4/2007 | Weber et al. | |
| 7,540,150 B2 | 6/2009 | Schmid et al. | |
| 8,146,542 B2 * | 4/2012 | Cattani et al. | ............ 123/568.11 |
| 8,209,982 B2 | 7/2012 | Sumser et al. | |
| 2010/0077747 A1 | 4/2010 | Pierpont et al. | |
| 2010/0095941 A1 | 4/2010 | Auffret et al. | |
| 2010/0263369 A1 * | 10/2010 | Kardos et al. | ................... 60/599 |

(Continued)

FOREIGN PATENT DOCUMENTS

| | | |
|---|---|---|
| EP | 1008735 A2 | 6/2000 |
| EP | 2148061 A1 | 1/2010 |

(Continued)

OTHER PUBLICATIONS

International Searching Authority, Notification of Transmittal of The International Search Report and The Written Opinion of The International Searching Authority, of the Declaration, Jul. 21, 2014, 11 pages.

*Primary Examiner* — Mary A Davis
(74) *Attorney, Agent, or Firm* — Krieg DeVault LLP

(57) ABSTRACT

A turbocharged internal combustion engine system includes at least one high pressure turbocharger system and at least one low pressure turbocharger system. An air-to-air intercooler is connected between the low pressure compressor of the low pressure turbocharger system and the high pressure compressor of the high pressure turbocharger system. An air-to-water aftercooler is connected to the intake system between the high pressure compressors and the intakes of the cylinders of the internal combustion engine.

14 Claims, 1 Drawing Sheet

(56) References Cited

U.S. PATENT DOCUMENTS

| | | |
|---|---|---|
| 2011/0036087 A1 | 2/2011 | Miller |
| 2011/0100343 A1 | 5/2011 | Liu et al. |
| 2011/0185724 A1 | 8/2011 | Barth et al. |
| 2011/0252795 A1 | 10/2011 | Heyes |
| 2011/0253112 A1 | 10/2011 | Guggenberger et al. |
| 2011/0259306 A1 | 10/2011 | Winsor et al. |
| 2012/0036853 A1 | 2/2012 | Kidd et al. |
| 2013/0008161 A1* | 1/2013 | Flohr .............................. 60/600 |

FOREIGN PATENT DOCUMENTS

| | | | |
|---|---|---|---|
| GB | 2353328 A | 2/2001 | |
| JP | 55109726 A * | 8/1980 | .............. F02B 37/00 |
| WO | 2006015814 A1 | 2/2006 | |
| WO | 2012016712 A1 | 2/2012 | |

* cited by examiner

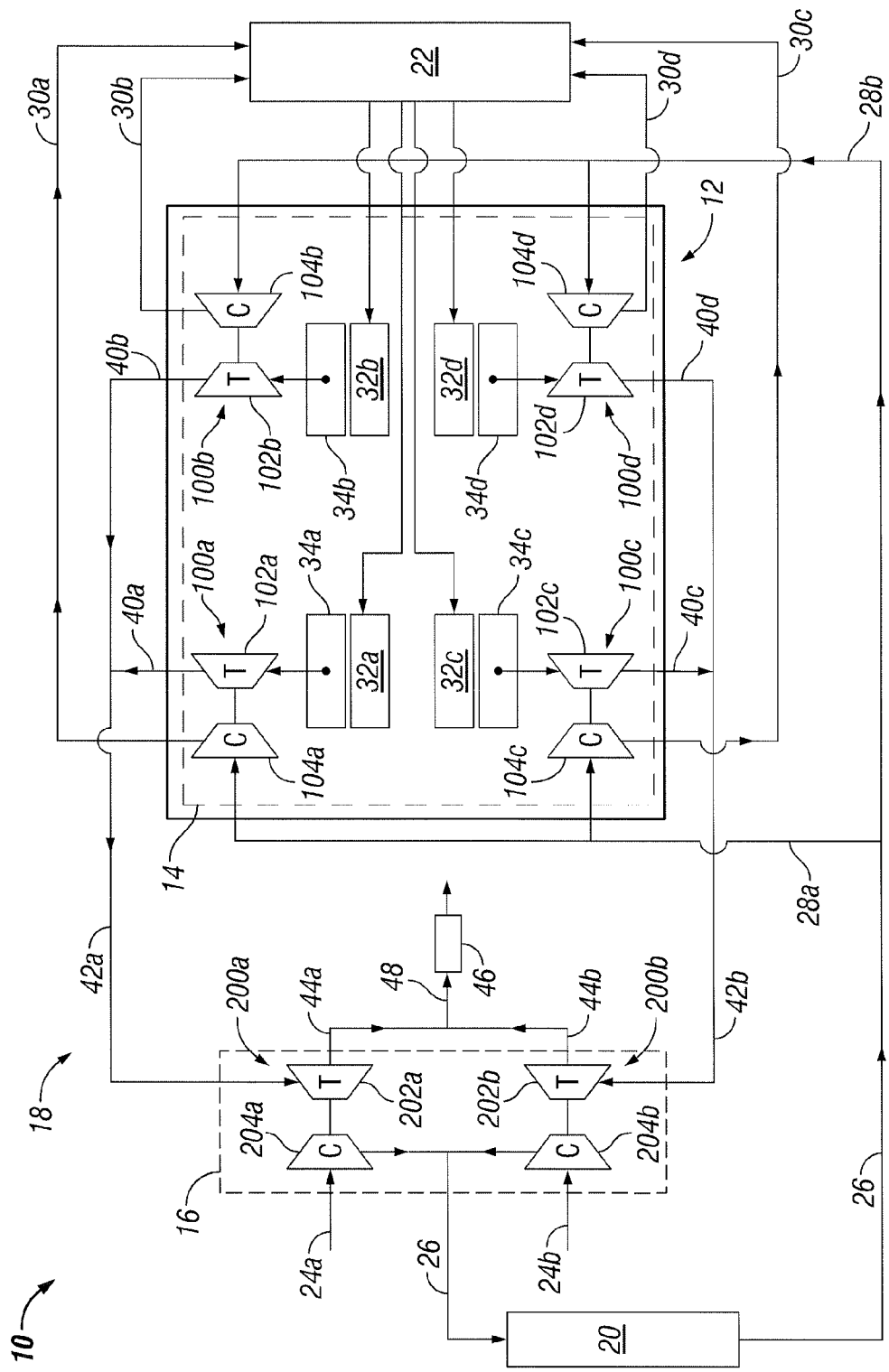

MULTI-STAGE TURBOCHARGER SYSTEM WITH INTERCOOLING AND AFTERCOOLING

FIELD OF THE INVENTION

The present invention relates to a multi-stage turbocharger system. Particularly, but not exclusively, the present invention relates to a two stage turbocharger system.

BACKGROUND

Turbochargers are well known devices for supplying air to the intake of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to the engine intake manifold.

One known approach to improving turbocharging efficiency and reducing emissions for an engine with a wide speed/load range is to provide a sequential two stage turbocharging system, comprising one relatively small high pressure turbocharger and another relatively large low pressure turbocharger. The turbochargers are arranged in series so that exhaust from the engine flows first through the smaller turbine of the high pressure turbocharger and then through the larger turbine of the low pressure turbocharger. The compressors of the two turbochargers are also arranged in series, with air flowing first through the relatively large compressor of the low pressure turbocharger and then through the relatively small compressor of the high pressure turbocharger. For high altitude large engine operation, air-to-water intercoolers and aftercoolers, which also may be referred to as water-to-air intercoolers and aftercoolers, can be employed to provide cooling of the intake flow after compression by the low pressure and high pressure turbochargers prior to delivery of the intake air to the intake manifold in order to increase efficiency and power output.

One problem with water cooled multi-stage turbocharger systems involves the complexity of the plumbing required to provide water to the intercooler and aftercooler to adequately cool the intake air flow. The plumbing and other peripherals associated with air-to-water intercoolers and aftercoolers hinder access to the engine's V-cavity and other peripheral components, inhibiting serviceability. Furthermore, installation costs are increased due to the complexity of the plumbing required to support air-to-water intercooling, and shipping and packaging costs are increased as well due to the large footprint and profile created by the support frame and other components required to support and operate the air-to-water intercoolers along with the associated plumbing. Therefore, there remains room for further improvements in this technology area.

SUMMARY

There is disclosed herein an alternative or improved multi-stage turbocharger system that includes an air-to-air intercooler between the stages and an air-to-water aftercooler after the stages and before the intake to the cylinders of the internal combustion engine.

According to one aspect, a system is disclosed that includes a turbocharged internal combustion engine which includes at least one high-pressure turbocharger with a first high pressure turbine situated in a first exhaust passage from the internal combustion engine and at least one low pressure turbocharger with a low pressure turbine situated in the first exhaust passage downstream of the first high pressure turbine. The low pressure turbocharger further includes a low pressure compressor operably connected to the low pressure turbine with the low pressure compressor situated in a first intake passage of the internal combustion engine. The high pressure turbocharger further includes a first high pressure compressor connected with the first high pressure turbine with the first high pressure compressor situated in the first intake passage downstream of the low pressure compressor. The turbocharged internal combustion engine further includes an air-to-air intercooler in the intake passage between the low pressure compressor and the high pressure compressor and an air-to-water aftercooler in the intake passage downstream of the high pressure compressor and upstream of an intake manifold of the internal combustion engine.

According to one embodiment, the at least one high pressure turbocharger includes at least two high pressure turbochargers with respective first and second high pressure turbines connected to respective ones of first and second exhaust passages. The first and second exhaust passages come together and form a first common exhaust passage that is connected to the low pressure turbine of the low pressure turbocharger. The at least two high pressure turbochargers further include respective first and second high pressure compressors that are connected to respective ones of second and third intake passages that branch from the first intake passage downstream of the low pressure compressor.

According to a further embodiment, the at least one low pressure turbocharger includes first and second low pressure turbochargers with first and second low pressure turbines operably connected with respective ones of first and second low pressure compressors. The at least one high pressure turbocharger includes at least four high pressure turbochargers with respective first, second, third and fourth high pressure turbines operably connected to respective ones of first, second, third, and fourth exhaust passages. The first and second exhaust passages come together and form a first common exhaust passage that is connected to the first low pressure turbine of the first low pressure turbocharger. The third and fourth exhaust passages come together and form a second common exhaust passage that is connected to the second low pressure turbine of the second low pressure turbocharger. The first and second low pressure turbochargers include first and second outlets that come together at the first intake passage upstream of the air-to-air intercooler, or the first and second outlets can be connected directly to the intercooler. The first intake passage branches downstream from the air-to-air intercooler into second and third intake passages. The at least four high pressure turbochargers further include respective first, second, third and fourth high pressure compressors that are connected to respective ones of second and third intake passages that branch from the first intake passage. The second intake passage is connected to the first and third high pressure compressors and the third intake passage is connected to the second and fourth high pressure compressors. Each of the first, second, third and fourth high pressure compressors is connected to the air-to-water aftercooler.

According yet another embodiment, the internal combustion engine is more than 2000 horsepower. In a further embodiment, the engine is operated at high altitudes.

In yet another aspect, a method includes operating a combustion engine fitted with a sequential two-stage (or multi-stage) turbocharging system in which an intake flow is passed via an intake passage through an air-to-air intercooler after passing through a compressor of at least one low pressure turbocharger and then through an air-to-water aftercooler after passing through a compressor of at least one high pressure turbocharger. The intake flow is provided to the intake of a plurality of cylinders after passing through the air-to-water aftercooler.

According to one embodiment of the method, the at least one high pressure turbocharger includes at least two high pressure turbochargers with respective first and second high pressure turbines connected to respective ones of first and second exhaust passages. The first and second exhaust passages come together and form a first common exhaust passage that is connected to the low pressure turbine of the low pressure turbocharger. The at least two high pressure turbochargers further include respective first and second high pressure compressors that are connected to the respective ones of second and third intake passages that branch from the intake passage downstream of the low pressure compressor.

According to a further embodiment of the method, the at least one low pressure turbocharger includes first and second low pressure turbochargers with first and second low pressure turbines operably connected with respective ones of first and second low pressure compressors. The at least one high pressure turbocharger includes at least four high pressure turbochargers with respective first, second, third and fourth high pressure turbines operably connected to respective ones of first, second, third, and fourth exhaust passages. The first and second exhaust passages come together and form a first common exhaust passage that is connected to the first low pressure turbine of the first low pressure turbocharger. The third and fourth exhaust passages come together and form a second common exhaust passage that is connected to the second low pressure turbine of the second low pressure turbocharger. The first and second low pressure compressors include first and second outlets that come together at the intake passage upstream of or at the air-to-air intercooler. The intake passage branches downstream from the air-to-air intercooler into second and third intake passages. The at least four high pressure turbochargers further include respective first, second, third and fourth high pressure compressors that are connected to the respective ones of second and third intake passages that branch from the first intake passage. The second intake passage is connected to the first and third high pressure compressors and the third intake passage is connected to the second and fourth high pressure compressors. Each of the first, second, third and fourth high pressure compressors is connected to inlets of the air-to-water aftercooler.

Other aspects, embodiments, features and applications of the present invention will be apparent from the following description.

BRIEF DESCRIPTION OF THE DRAWINGS

FIG. 1 is a schematic illustration of a two-stage turbocharging system.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referring to FIG. 1, the schematically illustrated sequential two stage turbocharging system 10 comprises an internal combustion engine 12 with a high pressure turbocharger stage or system 14 and a low pressure turbocharger stage or system 16. High pressure turbocharger system 14 includes at least one relatively small high pressure turbocharger 100a, and low pressure turbocharger system 16 includes at least one relatively large low pressure turbocharger 200a connected in series to the exhaust system 18 of internal combustion engine 12 such as a diesel engine. The high pressure turbocharger 100a comprises a relatively small exhaust turbine 102a and a relatively small compressor 104a. The low pressure turbocharger 200a comprises a relatively large exhaust turbine 202a and a relatively large compressor 204a.

The turbocharging system 10 delivers compressed air to the engine 12, air-to-air intercooler 20, and air-to-water aftercooler 22 via an air inlet 24a to the low pressure compressor 204a. As used herein, "air" includes fresh air alone or a mixture of fresh air and another component or components, such as any exhaust gas that may be recirculated for mixing with the fresh air and/or fuel that is injected or mixed at the compressor. In one embodiment, engine 12 is a large engine greater than 2000 horsepower and turbocharging system 10 is particularly suited for high altitude operation, such as at 5000 feet or more above sea level. Compressed inlet air is outlet from compressor 204a either directly or via an intake passage 26 into an inlet of air-to-air intercooler 20. The compressed inlet air is cooled in intercooler 20 via an air-to-air heat exchange process, and then outlet to intake passage 26 for delivery of cooled, compressed inlet air to high pressure compressor 104a via a second intake passage 28a. High pressure compressor 104a further compresses and outlets the cooled, compressed inlet air to aftercooler inlet 30a. The highly compressed inlet air is then cooled further by air-to-water aftercooler 22 and delivered to intake manifold portion 32a for combustion by one or more cylinders (not shown) of engine 12 that are connected to intake manifold portion 32a.

After the turbocharged inlet air is combusted in the respective cylinder or cylinder(s) of engine 12, the exhaust gas is outlet into an exhaust manifold portion 34a where it is delivered to the inlet of high pressure turbine 102a to drive high pressure compressor 104a. The exhaust gas is then outlet from high pressure turbine 102a into a first exhaust passage portion 40a that is connected to a first common exhaust passage 42a. Exhaust gas is delivered to an inlet of low pressure turbine 202a from first common exhaust passage 42a in order to drive low pressure compressor 204a. Exhaust gas leaves low pressure turbine 202a from an outlet that is connected to first exhaust outlet portion 44a. First exhaust outlet portion 44a is connected to an exhaust outlet 48 having a conventional aftertreatment system 46 to treat the exhaust gas for emissions prior to being outlet to atmosphere. The aftertreatment system 46 may be one of a variety of types of after-treatment systems, including conventional systems generally known to one of ordinary skill in the art. Types of after-treatment systems contemplated include those designed to remove particulates, nitrogen-oxide compounds, and other regulated emissions.

In one embodiment, turbocharging system 10 includes a low pressure turbocharging system 16 that includes a second low pressure turbocharger 200b. Second low pressure turbocharger 200b receives air flow from an air inlet 24b connected to the low pressure compressor 204b. Compressed inlet air is outlet from compressor 204b either directly or via a connection to intake passage 26 where it is combined with compressed inlet air from first low pressure compressor 204a for delivery to the inlet of air-to-air intercooler 20. The combined flow of compressed inlet air is cooled in intercooler 20 via an air-to-air heat exchange process, and then outlet to intake passage 26.

In a further embodiment, turbocharging system 10 includes a high pressure turbocharging system 16 that includes at least two high pressure turbochargers 100a and 100b. The cooled, compressed inlet air from intercooler 20 is delivered via the first or common intake passage 16 to second intake passage 28a and to a third intake passage 28b. Second intake passage 28a is connected to high pressure compressor 104a via first intake passage 28a where operation of high pressure turbocharger 200a continues as discussed above. Furthermore, high pressure turbocharging system 14 includes second high pressure turbocharger 100b with a second high pressure compressor 104b connected to third intake passage 28b. Second high pressure compressor 104b further compresses and outlets the cooled, compressed inlet air to aftercooler inlet 30b. The highly compressed inlet air is then cooled further by air-to-water aftercooler 22 and delivered to intake manifold portion 32b for combustion by one or more cylinders (not shown) of engine 12 that are connected to intake manifold portion 32b.

Exhaust gas that is outlet from the cylinder or cylinders connected to intake manifold portion 32b is collected in a second exhaust manifold portion 34b where it is delivered to the inlet of second high pressure turbine 102b to drive second high pressure compressor 104b. The exhaust gas is then outlet from second high pressure turbine 102b into a second exhaust passage portion 40b that is connected to first common exhaust passage 42a. Exhaust gas is then delivered to an inlet of low pressure turbine 202a from first common exhaust passage 42a in order to drive low pressure compressor 204a as discussed above.

In a further embodiment, turbocharging system 10 includes a high pressure turbocharging system 16 that includes four high pressure turbochargers 100a, 100b, 100c and 100d. The cooled, compressed inlet air from intercooler 20 is delivered via first or common intake passage 26 to second intake passage 28a and to third intake passage 28b. Second intake passage 28a is connected to high pressure compressor 104a via first intake passage 28a where operation of high pressure turbocharger 100a and aftercooling and combustion of the inlet air continues as discussed above. Furthermore, third high pressure turbocharger 100c includes a third high pressure compressor 104c connected to second intake passage 28a. Third high pressure compressor 104c further compresses and outlets the cooled, compressed inlet air to aftercooler inlet 30c. The highly compressed inlet air is then cooled further by water-to-air aftercooler 22 and delivered to intake manifold portion 32c for combustion by one or more cylinders (not shown) of engine 12 that are connected to intake manifold portion 32c.

Exhaust gas that is outlet from the cylinder or cylinders connected to intake manifold portion 32c is collected in a second exhaust manifold portion 34c where it is delivered to the inlet of third high pressure turbine 102c to drive third high pressure compressor 104c. The exhaust gas is then outlet from third high pressure turbine 102c into a third exhaust passage portion 40c that is connected to a second common exhaust passage 42b. Exhaust gas is then delivered to an inlet of second low pressure turbine 202b from second common exhaust passage 42b in order to drive low pressure compressor 204b as discussed above.

Third intake passage 28b is connected to second high pressure compressor 104b where operation of second high pressure turbocharger 100b and aftercooling and combustion of the inlet air continues as discussed above. Furthermore, fourth high pressure turbocharger 100d includes a fourth high pressure compressor 104d connected to third intake passage 28b. Fourth high pressure compressor 104d further compresses and outlets the cooled, compressed inlet air to aftercooler inlet 30d. The highly compressed inlet air is then cooled further by water-to-air aftercooler 22 and delivered to intake manifold portion 32d for combustion by one or more cylinders (not shown) of engine 12 that are connected to intake manifold portion 32d.

Exhaust gas that is outlet from the cylinder or cylinders connected to intake manifold portion 32d is collected in a second exhaust manifold portion 34d where it is delivered to the inlet of fourth high pressure turbine 102d to drive fourth high pressure compressor 104d. The exhaust gas is then outlet from fourth high pressure turbine 102c into a fourth exhaust passage portion 40d that is connected to second common exhaust passage 42b to combine with the exhaust flow from third high pressure turbine 102c in second common exhaust passage 42b to drive low pressure compressor 204b as discussed above.

In one embodiment, the air to air intercooler 20 is an intercooler that uses outside air to cool the intake air after it has been compressed by low pressure turbochargers 200a, 200b. Air-to-water aftercooler 22 can be located on top of engine 12 and connected with plumbing that provides cooling water or other fluid from a separate circuit (not shown) to the core of aftercooler 22. The plumbing can further be connected with a heat exchanger or radiator to reject the heat added to the cooling water from the compressed intake air flow into aftercooler 22. The compressed inlet air passes through fins of one or more stages of aftercooler 22 before being outlet to the intake manifold portions 32a-32d.

Intercooler 20 does not require power or fluid for operation and therefore can be readily incorporated into turbocharging system 10 with the air-to-water aftercooler 22 without requiring any plumbing additions, modifications or packaging for cooling water. As a result, the serviceability of engine 12 is enhanced while aftercooler 22 can be a modular component employed with turbocharger systems that only use an air-to-water aftercooler without intercooling, such as with single stage turbocharging systems. Furthermore, systems that employ only air-to-air intercooling and air-to-air aftercooling may lack sufficient power or exhibit less than optimal performance at high altitudes. Thus, the present turbocharging system 10 provides sufficient power and efficiency for high altitude operations without sacrificing serviceability and modularity or imposing packaging limitations created by air-to-water intercooled systems.

According to one embodiment of a method of use, operation, or application, two-stage turbocharging system 10 includes high pressure turbocharger system 14 and lower pressure turbocharger system 16 to maintain power output at high altitude. For example, using a two-stage system 10 allows the same power output at high altitude as that achieved at sea level. In order to achieve such power output levels at high altitudes, the same amount of air needs to be introduced to the cylinders of engine 12 as during operation at sea level. Therefore, a two-stage turbocharging system 10 including a high pressure turbocharger stage 14 and a low pressure turbocharger stage 16 is used to achieve the boost level to accommodate the required air flow at high altitude. The two-stage turbocharging system 10 allows the high boost levels to be achieved by maintaining relatively low turbine rotor speeds on both the low pressure and the high pressure turbines. This reduction in turbine speed often translates into improved turbocharger durability.

In another embodiment, a method of retrofitting and/or a retrofitted system is disclosed. An internal combustion engine 12 includes a single stage turbocharging system and an air-to-water aftercooling system 22. In one example, the engine 12 is employed in power generation where RAM air is not available. To retrofit or convert the engine 12 for use in a two-stage turbocharging system 10, a low pressure turbocharging system 16 is added to the base or high turbocharging system 14. The low pressure turbocharging system 16 includes the air-to-air intercooler 20. Thus, no additional plumbing or support structure is required to be added to support the low pressure air handling system, reducing complexity and the weight of the two-stage turbocharging system 10. In one particular retrofit method, an engine 12 employed with a power generation system having a single stage turbocharger and air-to-water aftercooler 22 is modified by adding a modular low pressure air handling system including one or more low pressure turbochargers 16 and an air-to-air intercooler 20 to provide a two-stage turbocharging system 10 that can be employed in mining trucks and equipment operated at high altitudes.

It will be appreciated that features and modifications that can be made to the turbocharging system of FIG. 1, such as for instance the inclusion of a wastegate around the low pressure turbine(s), and application of the system to an engine including the inclusion of an exhaust gas re-circulation system. Exhaust gas flow control valves can also be provided to modulate the exhaust gas flow to the high pressure and low pressure turbochargers in varied operating conditions, and in accordance with various possible control regimes.

Turbines may be of a fixed or variable geometry type. Variable geometry turbines differ from fixed geometry turbines in that the size of the inlet passageway can be varied to optimize gas flow velocities over a range of mass flow rates so that the power output of the turbine can be varied to suit varying engine demands. For instance, when the volume of exhaust gas being delivered to the turbine is relatively low, the velocity of the gas reaching the turbine wheel is maintained at a level which ensures efficient turbine operation by reducing the size of the annular inlet passageway. Turbochargers provided with a variable geometry turbine are referred to as variable geometry turbochargers.

Although two stage turbocharging systems comprising fixed geometry turbines may in some respects provide an alternative to the use of relatively complex and expensive variable geometry turbochargers, the turbochargers of one or both stages of the two stage turbocharging system could be a variable geometry turbocharger (of any type). This may be desirable for instance to further improve control over the turbocharging system and the ability to optimize turbocharging performance across a wide range of engine conditions.

In the above described embodiments of the invention there four parallel high pressure turbines. However, it will be appreciated that a turbocharging system according to the present invention could for instance include a single high pressure turbine. For example, the high pressure turbine could receive an exhaust gas flow from all of the cylinders from a multi-cylinder engine. In such embodiments, the outlet from the high pressure turbine can flow to a single low pressure turbine located downstream of the high pressure turbine, or the flow may be split between two (or more) low pressure turbines downstream of the high pressure turbine.

Furthermore, it will be appreciated that a turbocharging system according to the present invention could for instance include two parallel high pressure turbines. For example, each of two high pressure turbines could receive an exhaust gas flow from a respective bank of cylinders from a multi-cylinder engine (for instance each receiving exhaust gas from one bank of a "V" configured engine). In such embodiments, the outlet from each high pressure turbine can be combined upstream for flow to a single low pressure turbine located downstream of the high pressure turbines, or the flow may be split between two (or more) low pressure turbines downstream of the high pressure turbines.

In embodiments comprising more than one high pressure turbine, the high pressure turbines can be linked to a common high pressure compressor or to separate respective high pressure compressors. In embodiments comprising more than one low pressure turbine, the low pressure turbines can be linked to a common low pressure compressor or to separate respective low pressure compressors.

In embodiments comprising more than one high pressure turbine, the high pressure turbines can be linked to a common high pressure compressor or to separate respective high pressure compressors. In embodiments comprising more than one low pressure turbine, the low pressure turbines can be linked to a common low pressure compressor or to separate respective low pressure compressors.

Alternatively, rather than providing two separate high pressure turbines to receive exhaust gas flow from two separate banks of engine cylinders, a single twin entry high pressure turbine could be included in a turbocharger system according to the present invention. Moreover, in a turbocharger system according to the present invention comprising one or more high pressure turbines, each of the high pressure turbines could be configured as a twin-entry turbine.

Similarly, it will be appreciated that a turbocharging system in accordance with the present invention could have more than one set of sequentially connected turbochargers operating in parallel. For instance, a first turbocharging system generally as described above could receive an exhaust gas flow from a first set of cylinders of a multi-cylinder combustion engine, and a second sequential turbocharging arrangement as described above could receive exhaust gas flow from a second set of cylinders of the engine (each "set" could comprise a single cylinder).

It will further be appreciated that the present invention is not limited to a two stage sequential turbocharging system, but could be embodied in a turbocharging system comprising more than two turbine stages connected in series.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An internal combustion engine system, comprising:
an internal combustion engine including at least one intake passage for receiving and delivering an air flow to at least a portion of a plurality of cylinders of the internal combustion engine and at least one exhaust passage for receiving exhaust gas from at least a portion of the plurality of cylinders;

at least four high pressure turbochargers with respective ones of a first high pressure turbine, a second high pressure turbine, a third high pressure turbine, and a fourth high pressure turbine situated in respective ones of a first exhaust passage, a second exhaust passage, a third exhaust passage, and a fourth exhaust passage of the at least one exhaust passage;

a first low pressure turbocharger with a first low pressure turbine situated in the at least one exhaust passage downstream of the first and second high pressure turbines and a second low pressure turbocharger with a second low pressure turbine situated in the at least one exhaust passage downstream of the third and fourth high pressure turbines;

the first low pressure turbocharger further including a first low pressure compressor operably connected to the first low pressure turbine with the first low pressure compressor situated in the at least one intake passage and the second low pressure turbocharger including a second low pressure compressor operably connected with the second low pressure turbine with the second low pressure compressor situated in the at least one intake passage;

the first and second exhaust passages coming together downstream of the first and second high pressure turbines and forming a first common exhaust passage that is connected to the first low pressure turbine of the first low pressure turbocharger;

the third and fourth exhaust passages coming together downstream of the third and fourth high pressure turbines and forming a second common exhaust passage that is connected to the second low pressure turbine of the second low pressure turbocharger;

at least one of the at least four high pressure turbochargers further including a first high pressure compressor operably connected with at least the first high pressure turbine with the first high pressure compressor situated in the at least one intake passage downstream of the first low pressure compressor;

an intercooler in the at least one intake passage upstream of the first high pressure compressor and downstream of the first and second low pressure compressors; and an aftercooler in the at least one intake passage downstream of the first high pressure compressor and upstream of an intake manifold of the internal combustion engine.

2. The internal combustion engine system of claim 1, wherein the first and second low pressure compressors include outlets directly connected to or that come together upstream of the intercooler.

3. The internal combustion engine system of claim 2, wherein the first intake passage branches downstream from the intercooler into a second intake passage and a third intake passage.

4. The internal combustion engine system of claim 3, wherein:
the at least four high pressure turbochargers further include respective ones of the first high pressure compressor, a second high pressure compressor, a third high pressure compressor, and a fourth high pressure compressor;
the second intake passage is connected to the first high pressure compressor and the third high pressure compressor; and
the third intake passage is connected to the second high pressure compressor and the fourth high pressure compressor.

5. The internal combustion engine system of claim 4, wherein each of the first, the second, the third and the fourth high pressure compressors is connected separately to the aftercooler.

6. The internal combustion engine system of claim 1, wherein the internal combustion engine is greater than 2000 horsepower.

7. The internal combustion engine system of claim 1, wherein the intercooler is an air-to-air intercooler and the aftercooler is an air-to-water aftercooler.

8. A method of operating an internal combustion engine system, including:
operating a combustion engine fitted with a multi-stage turbocharging system, wherein operating the combustion engine includes:
passing an intake flow via an intake passage through an intercooler after passing the intake flow through a first low pressure compressor of a first low pressure turbocharger and through a second low pressure compressor of a second low pressure turbocharger, wherein the first low pressure compressor is operably connected to a first low pressure turbine and the second low pressure compressor is operably connected to a second low pressure turbine;
passing the compressed and cooled intake flow from the intercooler through at least one high pressure compressor of a first high pressure turbocharger including a first high pressure turbine, and further including a second high pressure turbocharger, a third high pressure turbocharger, and a fourth high pressure turbocharger, wherein the second, third and fourth high pressure turbochargers include a a second high pressure turbine, a third high pressure turbine, and a fourth high pressure turbine, respectively, and the first, second, third and fourth high pressure turbines are operably connected to respective ones of a first exhaust passage, a second exhaust passage, a third exhaust passage, and a fourth exhaust passage, wherein the first and second exhaust passages come together downstream of the first and second high pressure turbines and form a first common exhaust passage that is connected to the first low pressure turbine of the first low pressure turbocharger and the third and fourth exhaust passages come together downstream of the third and fourth high pressure turbines and form a second common exhaust passage that is connected to the second low pressure turbine of the second low pressure turbocharger;
passing the compressed intake flow from the at least one high pressure compressor through an aftercooler; and
introducing the cooled and compressed intake flow from the aftercooler into an intake of a plurality of cylinders of the combustion engine.

9. The method of operating the internal combustion engine system of claim 8, wherein the first low pressure compressor and the second low pressure compressor include respective ones of a first outlet and a second outlet that come together at the intake passage upstream of the intercooler.

10. The method of operating the internal combustion engine system of claim 9, wherein the intake passage branches downstream from the intercooler into a second intake passage and a third intake passage.

11. The method of operating the internal combustion engine system of claim 10, wherein the at least at least one high pressure compressor includes a first high pressure compressor and a second high pressure compressor that receive intake flow from the second intake passage and a third high pressure compressor and a fourth high pressure compressor that receive intake flow from the third intake passage.

12. The method of operating the internal combustion engine system of claim 11, wherein each of the first, second, third and fourth high pressure compressors is separately connected to the aftercooler.

13. The method of operating the internal combustion engine system of claim 8, including operating the combustion engine at a high altitude.

14. The method of operating the internal combustion engine system of claim 8, wherein the intercooler is an air-to-air intercooler and the aftercooler is an air-to-water aftercooler.

\* \* \* \* \*